Dec. 12, 1967 C. A. DEHNE 3,357,369
ANTI-BACKUP DEVICE FOR RELEASING DOG TROLLEY
Filed Oct. 21, 1965
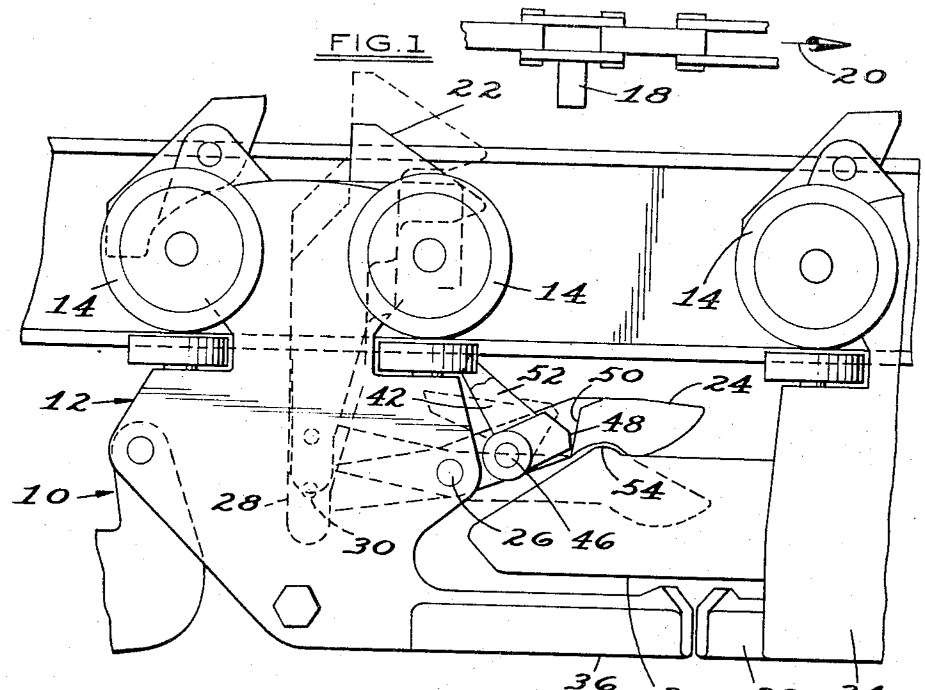
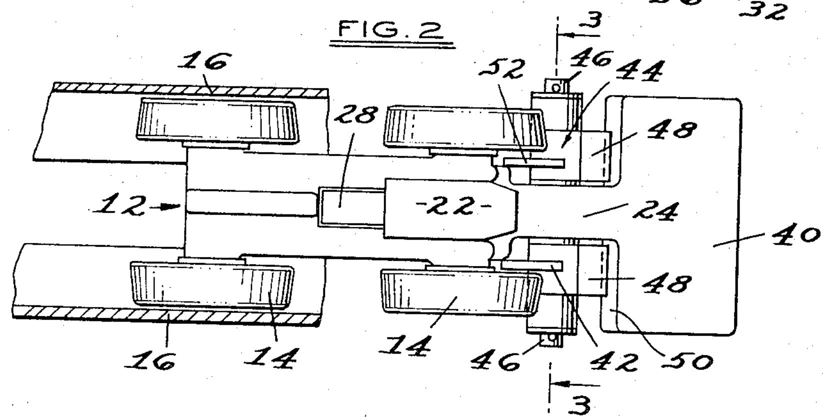
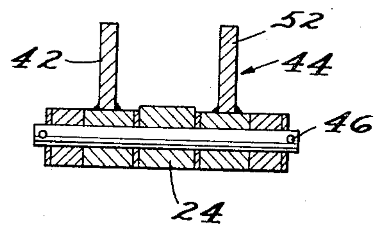
CLARENCE A. DEHNE
INVENTOR.
BY
Farley, Farley & Forster
ATTORNEYS United States Patent Office 3,357,369

Patented Dec. 12, 1967

3,357,369

ANTI-BACKUP DEVICE FOR RELEASING DOG TROLLEY

Clarence A. Dehne, Orchard Lake, Mich., assignor to Jervis B. Webb Company, a corporation of Michigan Filed Oct. 21, 1965, Ser. No. 499,601
8 Claims. (Cl. 104—172)

This invention relates to improvements in power and free conveyor carriers of the type disclosed in U.S. Patent 3,044,416 which are provided with means for moving the carrier driving dog to a non-driving position with relation to a pusher of a propelling member in response to engagement between the carrier and an object in the path of forward carrier movement, such as a preceding stopped carrier.

When movement of a carrier of this type is arrested by contact with an object in the path of travel, there is a tendency for the carrier to rebound or move in the reverse direction, and if this rebounding movement is sufficient in extent, the mechanism which moves the carrier driving dog to the non-driving position will lose engagement with the object in the path of travel and cause the carrier driving dog to return to its normal driving position and be picked up by the next advancing pusher of the propelling member. Starting and stopping of a carrier is thus produced which is particularly objectionable where successive carriers are being stopped and accumulated in a bank and released from the bank as desired.

The present invention provides a simple and effective anti-backup device for limiting reverse carrier movement under the conditions outlined above, and consisting of a pawl pivotally mounted on the driving dog releasing member of the carrier and having a projecting portion which pivots into biting engagement with the carrier supporting track in response to rebounding carrier movement when the dog releasing member is in its released position.

Other features and advantages will be apparent from the following description of the presently preferred construction of the invention disclosed in the accompanying drawings in which:

FIGURE 1 is a side elevation of the forward portion of a conveyor carrier with the dog releasing mechanism shown in full line in released position;

FIGURE 2 is a plan view of the structure shown in FIG. 1 with a portion of the conveyor track broken away for clarity; and FIGURE 3 is a sectional detail taken as indicated by the line 3—3 of FIG. 2.

In the construction illustrated a load carrier 10 includes a front trolley 12 having pairs of wheels 14 which ride on a pair of laterally spaced channels 16 of a load supporting track of a power and free conveyor, and is propelled along this track by a pusher 18 of an endless propelling member supported in the conventional manner from an upper track (not shown) and travelling in the direction of the arrow 20. The trolley 12 is similar to the trolley construction illustrated in U.S. Patent 3,044,-416 and is provided with a driving dog 22 which can be moved from the raised position indicated in broken line in which the dog is engageable by the pusher 18, to a lowered non-driving position shown in full line.

This releasing movement of the driving dog 22 is produced by movement of a dog releasing lever or member 24 connected to the trolley body by a pivot 26 and to a depending arm 28 forming part of the driving dog 22 by a pivot 30. Actuation of the releasing lever 24 takes place in response to contact with an object in the path of forward motion of the carrier such as a rearwardly projecting operating cam 32 of an immediately preceding carrier 34. The releasing lever 24 includes an enlarged forward portion 40 which serves as a counterweight to normally bias the releasing lever to a normal position in which the driving dog is in its raised driving position. The carrier 10 and the carrier 34 are preferably provided with bumpers 36 and 38 respectively.

Contact between the carrier 10 and the preceding stopped carrier 34 tends to cause the carrier 10 to rebound and move in the reverse direction. If this movement is sufficient, the dog releasing lever 24 can lose engagement with the operating cam 32 of the preceding carrier 34 and the driving dog 22 will then return to driving position to be engaged by the next advancing pusher 18 with a possible repetition of the rebounding action.

Rebounding carrier movement is limited by the construction of the present invention. A pair of pawl-like members 42 and 44 are each freely pivoted on a pin 46 carried by the dog releasing lever 24. Each pawl 42 and 44 includes a pointed end portion 52, adapted to engage the underflange of one of the track channels 16, and an enlarged counterweight portion 48 for normally urging the pawl into engagement with an abutment surface 50 formed on the enlarged portion 40 of the lever 24 which defines an operative position for the pawl relative to the releasing lever and track flange, and which limits pivotal movement of a pawl in an operative direction.

When the dog releasing lever 24 is moved from normal to releasing position as by engagement with the operating cam 32 of the preceding stopped carrier, the pawls 42 and 44 are raised to a level where their pointed end portions 52 can engage and slide along the lower rail flanges, and their counterweight portions 48 pivot out of engagement with the abutment surface 50 as necessary. Any rebounding or reverse movement of the carrier 10 will cause the end portions 52 of the pawls to bite into the lower rail flanges and thereby resist movement in the reverse direction. Such resistance to reverse movement of the carrier is augmented by increased frictional resistance between the engaging surfaces of the releasing lever 24, the operating cam 32 of the preceding carrier and the bumper 36, the cam 32 being in effect clamped between the dog releasing lever 24 and bumper 36 by the pivotal movement of the dog releasing lever which tends to result from biting engagement of the pawls with the rail.

Additional locking action between the pawls 42 and 44 and the rails can be obtained by providing a raised cam portion 54 on the upper surface of the operating cam 32 which the releasing lever overrides as the carrier 10 contacts the preceding carrier 34. Should rebounding movement of the carrier 10 occur, the pawls 42 and 44 would be forced more firmly against the rail flanges as the releasing lever 24 rides up on the cam means 54.

Since the pawls 42 and 44 are freely pivoted on the pin 46, they act independent of one another in engaging the rail flanges to provide maximum motion arresting action with self-compensation for any irregularities in the rails and in the relative position of the carrier and rails. The pawls offer no interference to forward carrier movement or to return movement of the releasing lever 24 when the preceding carrier 34 moves on.

While preferred embodiments have been described above in detail, it will be understood that numerous modifications might be resorted to without departing from the scope of the invention as defined in the following claims.

I claim:

1. A conveyor carrier of the type which is movable along a supporting track by engagement of a pusher of a propelling member with a driving dog on the carrier and which is provided with means for moving the driving dog between driving and non-driving positions including a forwardly projecting dog releasing member mounted for movement from normal to a released position in response to engagement with an object in the path of carrier movement, characterized by anti-backup means mounted on the dog releasing member and engageable with the carrier supporting track when the dog releasing member is in its said released position.

2. A conveyor carrier as claimed in claim 1 further characterized by the anti-backup means comprising a pawl pivotally mounted on the dog releasing member and having a projecting portion adapted to engage the carrier supporting track in response to carrier movement in the reverse direction.

3. A conveyor carrier as claimed in claim 2 further characterized by means normally urging the pawl to an operative position relative to the releasing lever and carrier track.

4. A conveyor carrier as claimed in claim 3 wherein the means normally urging the pawl to an operative position comprises a counterweight portion on the pawl and an abutment surface on the releasing lever engageable by said counterweight portion.

5. A conveyor carrier as claimed in claim 1 further characterized by the anti-backup means comprising a pair of pawls each freely mounted for pivotal movement on a pin carried by the releasing member, each pawl including a track engaging portion and means for normally urging the track engaging portion to an operative position relative to the releasing member and carrier supporting track comprising a counterweight portion on each pawl of an abutment surface on the dog releasing member engageable by said counterweight portion.

6. A conveyor carrier of the type which is movable along a supporting track by engagement of a pusher of a propelling member with a driving dog on the carrier and which is provided with means for moving the driving dog between driving and non-driving positions including a forwardly projecting dog releasing member mounted for movement from normal to a released position in response to engagement with an object in the path of carrier movement, characterized by anti-backup means provided on the carrier for engagement with the carrier supporting track in response to movement of the dog releasing member to its said released position and in response to carrier movement in the reverse direction.

7. A conveyor carrier as claimed in claim 6 further characterized by cam means provided on said object for increasing the engagement of the anti-backup means with the carrier supporting track in response to carrier movement in the reverse direction.

8. A conveyor carrier of the type which is movable along a supporting track by engagement of a pusher of a propelling member with a driving dog on the carrier and which is provided with means for moving the driving dog between driving and non-driving positions including a forwardly projecting dog releasing member mounted for movement from normal to a released position in response to engagement with a rearwardly projecting operating cam on an immediately preceding carrier characterized by anti-backup means mounted on the dog releasing member and engageable with the carrier supporting track when the dog releasing member is in its said released position, and a cam surface on the operating cam for increasing the engagement between the anti-backup means and carrier supporting track in response to carrier movement in the reverse direction.

No references cited.

ARTHUR L. LA POINT, *Primary Examiner.*

D. F. WORTH, *Assistant Examiner.*